United States Patent [19]
Satoh et al.

[11] Patent Number: 5,585,573
[45] Date of Patent: Dec. 17, 1996

[54] TORQUE SENSOR

[75] Inventors: Kouichi Satoh, Maebashi; Kazuo Chikaraishi, Takasaki, both of Japan

[73] Assignee: NSK Ltd., Tokyo, Japan

[21] Appl. No.: 554,706

[22] Filed: Nov. 7, 1995

[30] Foreign Application Priority Data

Nov. 10, 1994 [JP] Japan .................................. 6-276592
Nov. 10, 1994 [JP] Japan .................................. 6-276593

[51] Int. Cl.⁶ .................................................. G01L 3/02
[52] U.S. Cl. ............................................... 73/862.331
[58] Field of Search ..................... 73/862.331, 862.332, 73/862.333, 862.334

[56] References Cited

FOREIGN PATENT DOCUMENTS 1-142831  9/1989  Japan .
4-47638   4/1992  Japan .

*Primary Examiner*—Elizabeth L. Dougherty
*Attorney, Agent, or Firm*—Shapiro and Shapiro

[57] ABSTRACT

The torque sensor of the present invention converts the torsion of a shaft into an amount of movement of a slider member and detects the amount of movement of the slider member as a variation in the self-inductance of a detection coil unit. The detection coil unit is a bobbin having a coil wound thereon. The bobbin has a cylindrical portion, first and second annular flange portions provided on axially opposite ends of the cylindrical portion, and a third annular flange portion provided between the first and second flange portions. The coil is wound on a second groove defined between the second and third flange portions. An end portion of the coil is connected and fixed to a lead wire (connected to a detection circuit unit) in a first groove defined between the first and third flange portions. The diameter of one of the flange portions of the detection coil unit can be larger than the diameter of the other flange portions to prevent improper assembly of the detection coil unit.

4 Claims, 4 Drawing Sheets

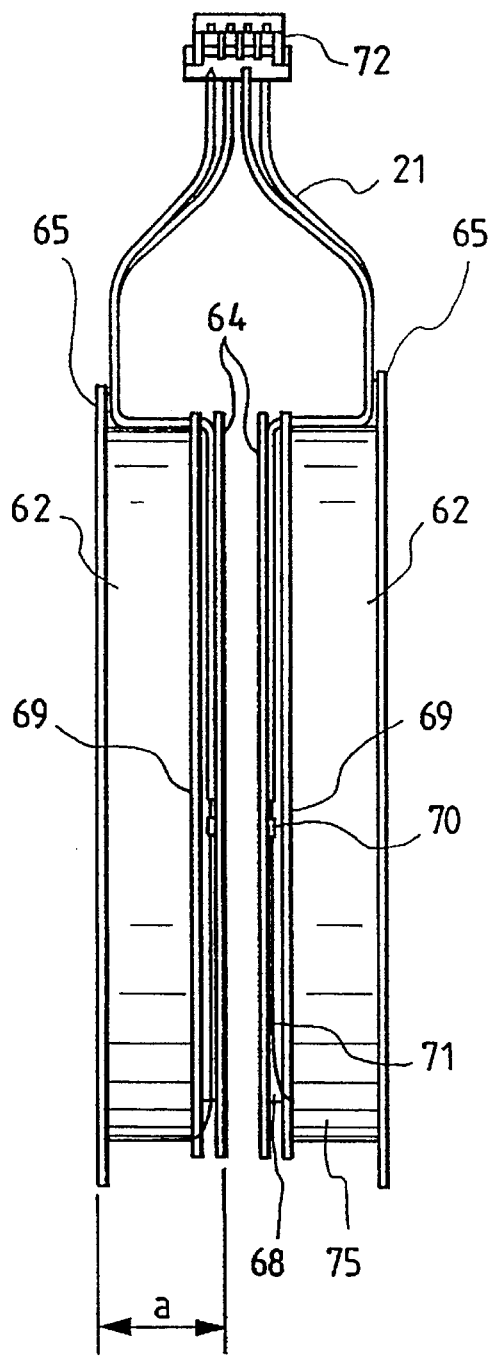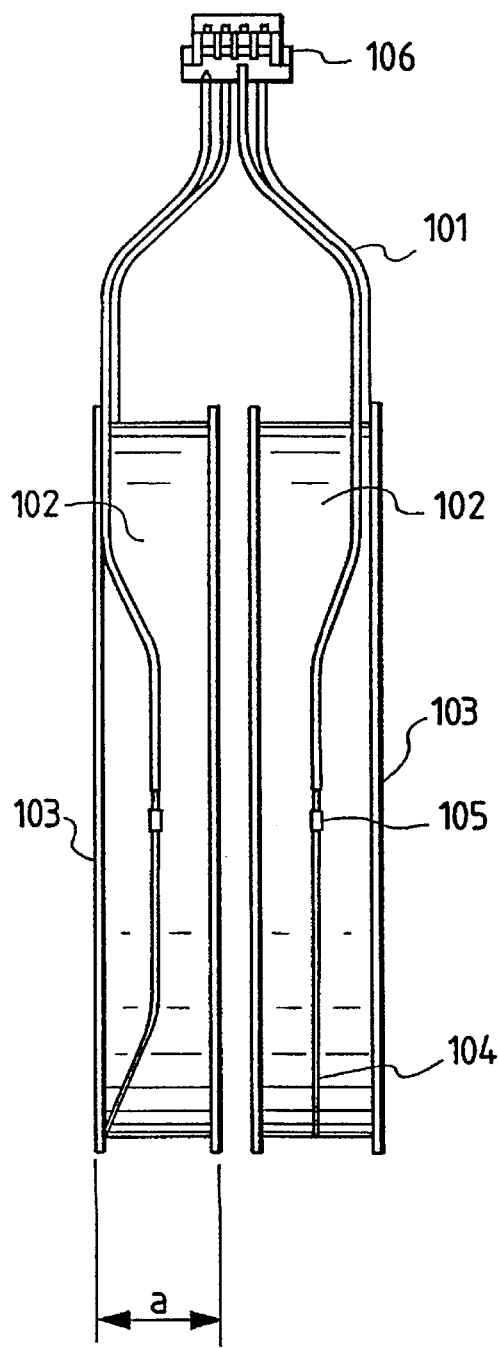

5,585,573

TORQUE SENSOR

BACKGROUND OF THE INVENTION

1. Field of the Invention

This invention relates to improvements in a torque sensor for use in an electrically driven type power steering apparatus carried on a vehicle or the like for aiding in the steering operation and mitigating a force necessary for steering.

2. Related Background Art

A known electrically operated type power steering apparatus in a vehicle or the like is designed such that the rotational output of an electric motor, which provides an auxiliary steering torque, is decelerated by a gear device and is transmitted to the output shaft of a steering mechanism to thereby aid a steering force applied to a steering wheel and effect the steering of wheels. In such an electrically operated type power steering apparatus, a torque sensor is provided for detecting a steering force, i.e., a torque, transmitted to an input shaft. An electric motor is driven in conformity with the result of the detection by the torque sensor, whereby an auxiliary steering force is generated.

Such a torque sensor is described, for example, in Japanese Utility Model Application Laid-Open No. 1-142831 or 4-47638. In the torque sensor disclosed in these publications, a lead wire connected to a detection circuit portion and a coil winding wound on a bobbin are soldered together at a predetermined location on the coil winding. Also, flange portions at the opposite ends of the bobbin have of the same diameter.

This prior art, however, has suffered from the following problems. Firstly, there has been the possibility of the winding wound on the bobbin being damaged during the soldering of the winding and the lead wire and by the soldered portion itself and the coil winding being short-circuited or broken. In such case, the reliability of the sensor is not obtained.

Further, there has been the problem that if a great change in the shape is done in the direction of movement of a slider, the characteristic of the output of the sensor will vary, and also there has been the requirement that dimensions in the axial direction must be made small in terms of column layout.

Further, there has been the problem that if the shape is changed significantly in the direction of movement of a slider, the characteristic of the output of the sensor will be changed. Also, there has been the requirement that dimensions in the axial direction must be made small in terms of column layout.

Also, if assembly is done with the directions of two coils mistaken, the coils will be liable to be affected by a disturbance magnetic field to thereby reduce the performance. Therefore, special care is needed during assembling to ensure that the directions of the coils are correct.

SUMMARY OF THE INVENTION

Accordingly, it is an object of the present invention to provide a torque sensor having its reliability as a sensor improved by avoiding damage to a winding and a lead wire during soldering work, and that can have the same bobbin size and the same output performance as in the prior art despite a change in the size of the coil winding in the direction of movement of a slider.

It is another object of the present invention to provide a torque sensor having its reliability improved by preventing improper assembling (converse assembling) of coils, and that can have the same bobbin size and the same output performance as in the prior art despite a change in the size of the coil winding in the direction of movement of a slider.

To achieve the above objects, the torque sensor of the present invention is a torque sensor for converting the torsion of a shaft into the amount of movement of a slider member, and detecting the amount of movement of said slider member as a variation in the self-inductance of a detection coil unit by a detection circuit unit, characterized in that said detection coil unit comprises a bobbin having a coil wound thereon, said bobbin has a cylindrical portion and first and second annular flange portions provided on the axially opposite ends of said cylindrical portion, a third annular flange portion is provided between said first and second flange portions, said coil is wound on a second groove defined between said second flange portion and said third flange portion, and the end portion of said coil is connected and fixed to a lead wire, which is connected to said detection circuit unit, in a first groove defined between said first flange portion and said third flange portion.

According to the torque sensor of the present invention, the reliability as a sensor is improved because the winding and the lead wire are not damaged by the soldering work. In addition, the same bobbin size and the same output performance as in the prior art can be realized in spite of the size of the coil winding having been changed in the direction of movement of the slider.

Also, the diameter of one of the annular flange portions of the detection coil portion is larger than the diameters of the other flange portions and therefore, reliability can be improved because improper assembling (converse assembling) of coils can be prevented.

BRIEF DESCRIPTION OF THE DRAWINGS

FIG. 3 is an enlarged view of principal portions of the detection coil unit showing the relations between bobbins and a cable.

FIG. 4 is an enlarged view of principal portions of a detection coil unit according to the prior art showing the relations between bobbins and a cable.

DESCRIPTION OF THE PREFERRED EMBODIMENT

Figure 1:
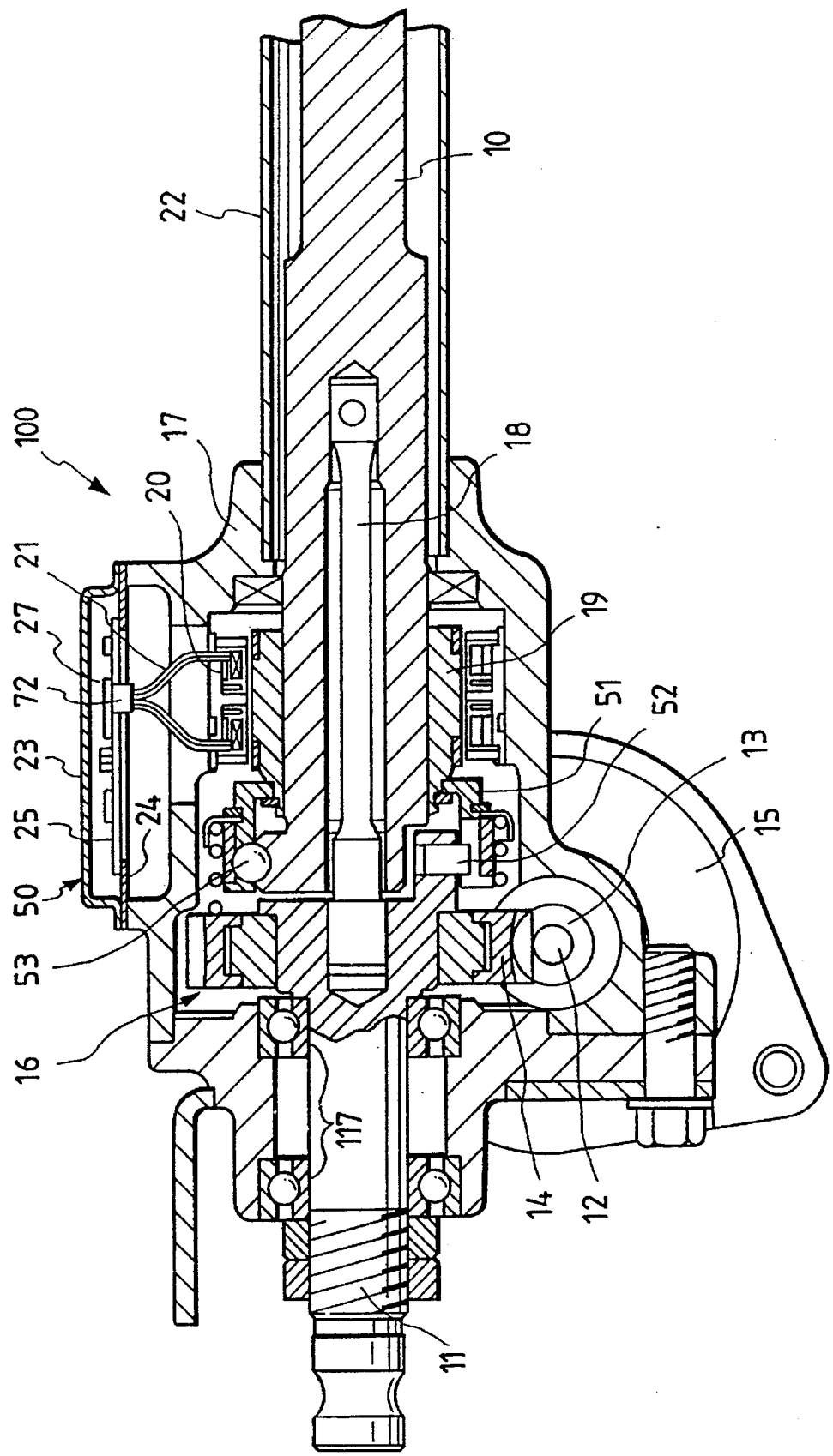
FIG. 1 is a view, partly in longitudinal cross-section, showing a torque sensor according to an embodiment of the present invention as it is mounted on an electrically operated type power steering apparatus.

An embodiment of the present invention will hereinafter be described in detail with reference to the drawings throughout which the same portions are designated by the same reference numerals.

FIG. 1 is a view, partly in longitudinal cross-section, showing a torque sensor 50 according to an embodiment of the present invention as it is mounted on an electrically operated type power steering apparatus 100.

In FIG. 1, the electrically operated type power steering apparatus 100 is inserted in a cylindrical lower column 22, and is connected to a steering wheel, not shown, through a mechanism, not shown. The apparatus 100 has an input shaft 10 to which the steering force of the steering wheel is transmitted, an output shaft 11 disposed coaxially with the input shaft 10 and steering the wheels of a vehicle through a mechanism, not shown, and a torsion bar 18, which is a resilient member, inserted in the end portions of the input shaft 10 and the output shaft 11 which are opposed to each other.

The end portions of the input shaft 10 and the output shaft 11 in which the torsion bar 18 is inserted are contained in the body of the torque sensor 50, i.e., a housing 17. The output shaft 11 is rotatably supported by the housing cover 30 of the torque sensor 50 through a bearing 177. The input shaft 10 is rotatably supported by the housing 17. The housing 17 and the housing cover 30 together constitute a gear box containing a gear device or the like.

A cylindrical slider member 19 is fitted and fixed to the outer periphery of the input shaft 10 and rotates with the input shaft 10. Further, the slider member 19 slides axially of the input shaft 10 in conformity with the torsion of the torsion bar 18. The detection element of the torque sensor 50, i.e., a detection coil unit 20 which is a sensor unit for detecting torque, is disposed so as to be opposed to the outer periphery of the slider member 19 with a predetermined minute gap interposed therebetween. The detection coil unit 20 is connected to the detection circuit unit 27 on a base plate 25 by a cable 21. The detection coil unit 20 and the slider member 19 change their relative opposed position in conformity with the axial sliding movement of the slider 19, whereby on the basis of the amount of movement, a torque is detected as a variation in the self-inductance of the detection coil unit 20.

That is, when as in the embodiment shown in FIG. 1, a torque is inputted from the input shaft 10 and the torsion bar 18 is twisted, the slider member 19 is axially moved in conformity with the amount of torsion of the torsion bar 18 by a conventional mechanism comprising a pin 52 permitting the relative rotation of the input shaft 10 and the output shaft 11, a ball 53 moved in a spiral groove on the input shaft 10 by the relative rotation of the input shaft 10 and the output shaft 11, and a cross guide 51 axially moving in conformity with the movement of the ball 53. This movement of the slider member 19 is detected by the detection coil unit 20, and the detection circuit unit 27 provided with a differential amplifier or the like outputs an electrical signal.

Figure 2:
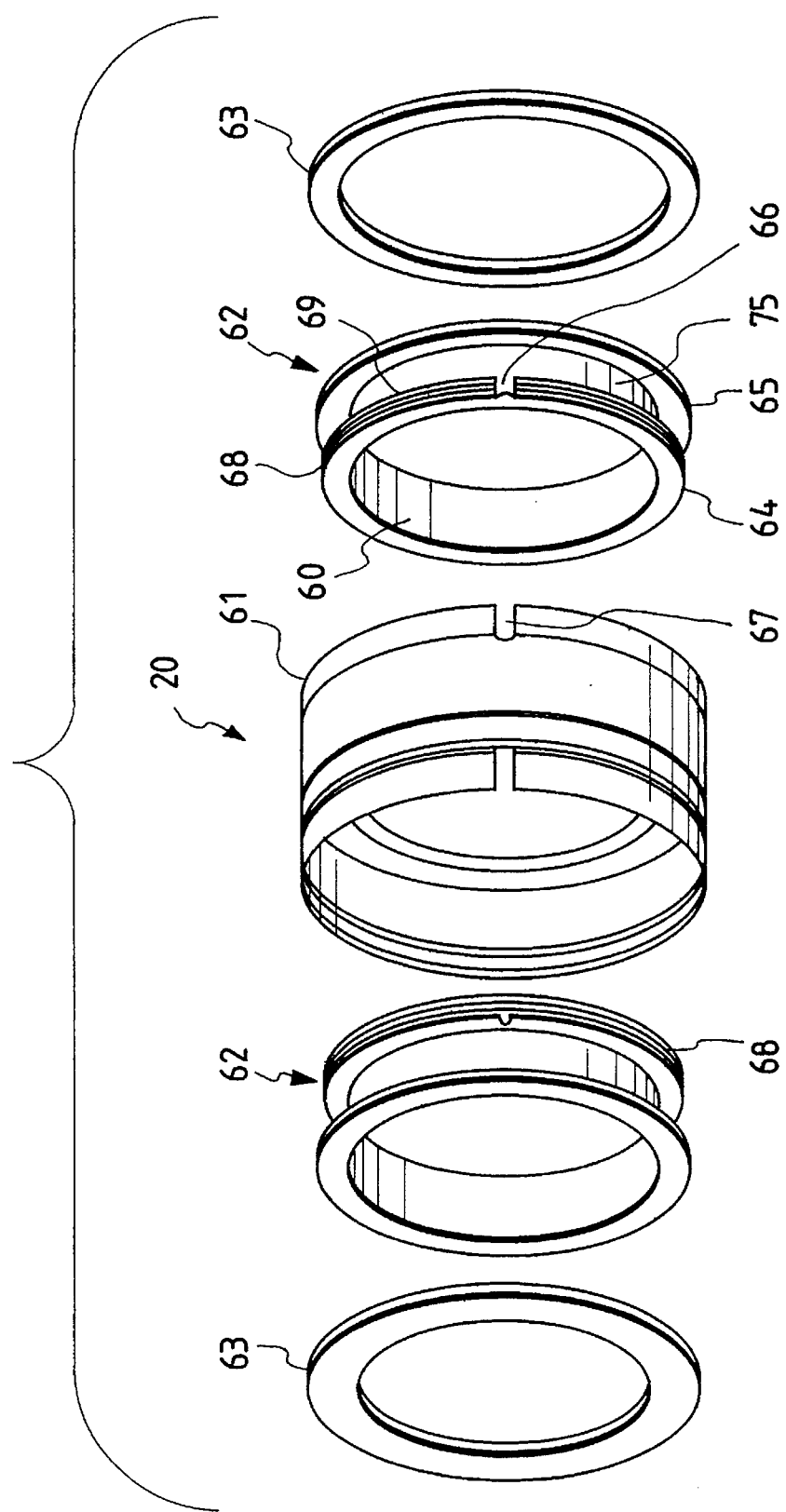
FIG. 2 is an assembly view showing the details of a detection coil unit.

FIG. 2 is an assembly view showing the details of the detection coil unit 20. The detection coil unit 20 comprises a substantially cylindrical bobbin yoke 61, two annular bobbins 62 fitted to the bobbin yoke 61 from the axially opposite ends thereof, and two yoke covers 63 fitted so as to close the bobbin yoke 61 from the outer sides of the bobbins 62.

The bobbins 62 each comprise a cylindrical portion 60 having a predetermined radius, a first ring-like flange portion 64 and a second ring-like flange portion 65 provided on the axially opposite ends of the cylindrical portion 60 and extending radially outwardly, and a third ring-like flange portion 69 provided on the outer periphery of the cylindrical portion 60 between the first and second flange portions 64 and 65. Between the first flange portion 64 and the third flange portion 69, a first groove 68 is defined on the outer periphery of the cylindrical portion 60, and between the second flange portion 65 and the third flange 69, a second groove 75 is defined on the outer periphery of the cylindrical portion 60.

The radial height of the first flange portion 64 is smaller than the radial height of the second flange portion 65. Also, the inner diameter of the bobbin yoke 61 is larger than the diameter of the first flange portion 64 and smaller than the diameter of the second flange portion 65. Accordingly, when the bobbins 62 are to be fitted to the bobbin yoke 61, they are inserted into the bobbin yoke 61 so that the first flanges 64 may be inside, as will be appreciated from FIG. 2. If the bobbins are assembled conversely to this, the bobbins will not enter because the second flange portion 65 is larger than the inner diameter of the bobbin yoke 61. In this manner, the bobbins 62 can be prevented from being assembled to the bobbin yoke 61 with their directions mistaken.

The axial width of the first groove 68 is smaller than the axial width of the second groove 75. A sensor coil 71 (see FIG. 3) is wound on the second groove 75, and the end portion of the sensor coil 71 passes through a cut-away 66 formed in the third flange portion 69 and is disposed in the first groove 68. The sensor coil 71 is not wound on the first groove 68, but a lead wire, i.e., the end portion of the cable 21, shown in FIG. 1, is disposed in the first groove 68, and the end portion of the sensor coil 71 and one end portion of the cable 21 are entangled with each other on the first groove 68 and are connected together by soldering. In that state, the sensor coil 71 and the cable 21, together with the connected portion 70, are fixed to the first groove 68 by filling this groove with an adhesive agent. Since the connection of the sensor coil 71 and the cable 21 by soldering is effected in the first groove 68, which is separated from the second groove 75 by the third flange portion 69, the sensor coil 71 wound around the second groove 75 can be prevented from being damaged by soldering. The other end portion of the cable 21 is connected to a connector 72 (FIG. 3) through a cut-away formed in the bobbin yoke 61. While the first flange portion 64 and the third flange portion 69 are of the same diameter in the embodiment illustrated, they need not always be of the same diameter, but may have diameters smaller than at least the diameter of the second flange portion 65.

The details of the bobbins 62 will now be described with reference to FIGS. 3 and 4. FIG. 3 is an enlarged view of the principal portions of the detection coil unit showing the relations between the bobbins 62 and the cable 21. FIG. 4 is an enlarged view of the principal portions of a detection coil unit according to the prior art showing the relations between bobbins 102 and a cable 101. As is apparent from FIG. 3, the cable 21 is fixed closely to the end portion of the second groove 75, and axially crosses the second groove 75 and enters the first groove 68 through a cut-away 66 in the third flange portion 69. The lead wire for detection wound on the second groove 75, i.e., the end portion of the sensor coil 71, is also disposed in the first groove 68 in the same manner. The cable 21 is connected to the end portion of the sensor coil 71 in the first groove 68 by soldering. The connected portion between the cable 21 and the sensor coil 71 is fixed to the first groove 68 by an adhesive agent. Thus, the soldering work for the cable 21 and the sensor coil 71 and the fixing work by the adhesive agent are all done in the first groove 68 and therefore, the sensor coil 71 in the second groove 75 can be prevented from being damaged by such work.

FIG. 4 shows the bobbins according to the prior art. The cable 101 extending from a connector 106 extends into in a single groove 105 defined by the flanges 103 of the bobbins and is connected to a sensor coil 104 on the groove 105 by soldering. Accordingly, there is the possibility of the wound sensor coil 104 being damaged by the soldering work.

As is apparent from FIGS. 3 and 4, the bobbins 62 in the present embodiment and the bobbins 102 according to the prior art have the same axial width a. Accordingly, the first groove 68 for the soldering work for the cable 21 and the sensor coil 71 and the fixing work by the adhesive agent can be formed without changing, namely, enlarging, the axial width of the bobbins. Thereby, the apparatus can be prevented from becoming bulky.

Figure 5:
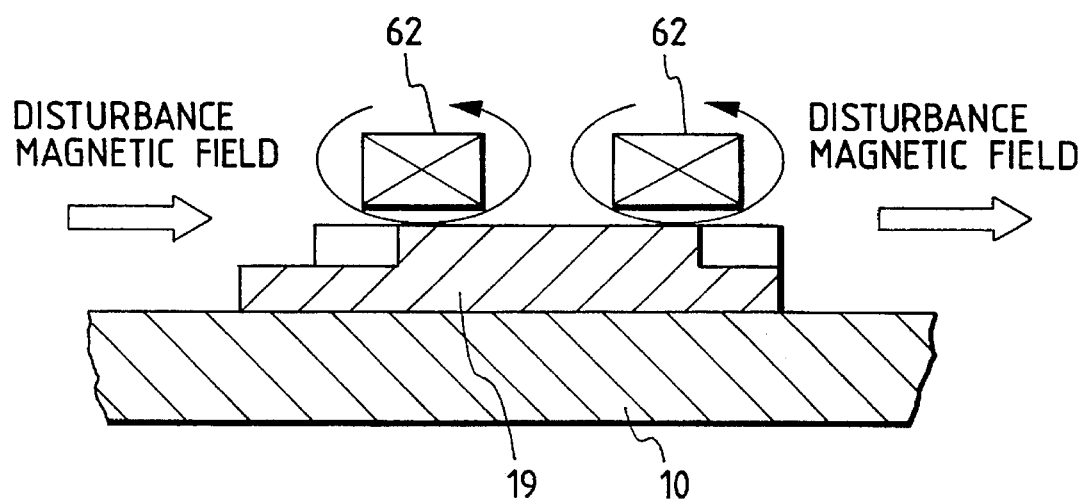
FIG. 5 is an illustration of the influence of a disturbance magnetic field acting on sensor coils.
Figure 6:
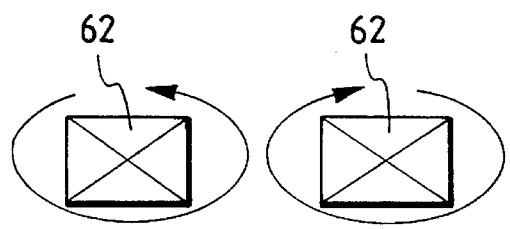
FIG. 6 is an illustration of the influence of a disturbance magnetic field acting on sensor coils.

The influence of a disturbance magnetic field acting on the sensor coil will now be described with reference to FIGS. 5 and 6. The sensor coils are wound in the same direction so that same phase components are cancelled by a differential amplifier if a disturbance magnetic field is created by the electric motor of the electrically operated power steering and other electric parts carried on the vehicle. When as shown, for example, in FIG. 5, a disturbance magnetic field is acting in the direction indicated by hollow arrows and the direction of winding of the sensor coils on the bobbins 62 is as indicated by solid arrows, the same phase components can be cancelled by the differential amplifier of the detection circuit unit 27. Then, the result of the detection by the torque sensor is not affected by the disturbance magnetic field. If, conversely, the sensor coils are combined improperly as shown in FIG. 6, the influences of the disturbance magnetic field will be multiplied. For this reason, in the embodiment of the present invention, the diameters of the flange portions of the bobbins are made to differ between the fore and rear portions thereof so that the converse combination of the bobbins cannot be made and the detection result will not be affected by the disturbance magnetic field.

The first groove of each bobbin is disposed on the side nearest the other bobbin (the axially inner side) so that the windings of the sensor coil may be disposed on the axially outer side of the bobbin, nearest the outer portion of the slider member. Thus, the output will not be degraded (the gain will not become low), despite the reduced dimension of the individual sensor coils in the direction of movement of the slider member. Moreover, the outer dimensions of the bobbins are made the same as in the prior art so as not to increase the dimension in the axial direction (see FIGS. 3 and 4).

According to the torque sensor of the present invention described above, there are obtained the following effects.

According to one aspect of the present invention, the groove on which the sensor coils are wound and the groove for effecting the connection of the end portions of the sensor coils and the lead wire of the detection circuit unit are arranged discretely from each other and therefore, the reliability as a sensor is improved by providing a structure in which the windings and the lead wire are not damaged by the soldering work.

Also, according to another aspect of the invention, there is obtained the effect that in spite of the size of the coil windings having been changed in the direction of movement of the slider member, the same bobbin size and the same output performance as in the prior art can be realized.

According to another aspect of the invention, the diameter of one of the annular flange portions of the detection coil unit is larger than the diameter of the other annular flange portion and therefore, there can be provided a torque sensor improved in reliability in which improper assembling (converse assembling) of the coils can be prevented.

What is claimed is:

1. A torque sensor for converting torsion of a shaft into an amount of movement of a slider member, and detecting the amount of movement of said slider member through a variation in self-inductance of a detection coil unit with a detection circuit unit, wherein said detection coil unit comprises a bobbin having a coil wound thereon, said bobbin has a cylindrical portion, first and second annular flange portions provided, respectively, on axially opposite ends of said cylindrical portion, and a third annular flange portion provided between said first and second flange portions, said coil is wound on a second groove defined between said second flange portion and said third flange portion, and an end portion of said coil is connected and fixed to a lead wire in a first groove defined between said first flange portion and said third flange portion, said lead wire being connected to said detection circuit unit.

2. The torque sensor of claim 1, wherein the diameter of said first flange portion is larger than the diameters of said second and third flange portions.

3. A detection coil unit for a torque sensor that moves a slider member a distance corresponding to torsion of a shaft and uses a detection circuit unit and a variation in self-inductance of said detection coil unit to detect said distance, said detection coil unit comprising:

a bobbin having a cylindrical portion, first and second annular flange portions provided, respectively, on axially opposite ends of said cylindrical portion, a third annular flange portion provided between said first and second flange portions, a first groove defined between said first flange portion and said third flange portion, and a second groove defined between said second flange portion and said third flange portion; and a coil wound on said second groove and having an end portion disposed in said first groove where said end portion is connected and fixed to a lead wire for connection to said detection circuit unit.

4. The detection coil unit of claim 3, wherein the diameter of said first flange portion is larger than the diameters of said second and third flange portions.

\* \* \* \* \*

UNITED STATES PATENT AND TRADEMARK OFFICE
CERTIFICATE OF CORRECTION

PATENT NO. : 5,585,573
DATED : December 17, 1996
INVENTOR(S) : Kouichi SATOH et al.

It is certified that error appears in the above-identified patent and that said Letters Patent is hereby corrected as shown below:

Claim 2:
    line 2, "first" should read --second--;
    line 3, "second" should read --first--.

Claim 4:
    line 2, "first" should read --second--;
    line 3, "second" should read --first--.

Signed and Sealed this

Twenty-ninth Day of December, 1998

Attest:

BRUCE LEHMAN

Attesting Officer      Commissioner of Patents and Trademarks